United States Patent
Lu

(10) Patent No.: US 7,491,901 B2
(45) Date of Patent: Feb. 17, 2009

(54) SHIELD CAGE ASSEMBLY AND INVERTER UTILIZING THE SAME

(75) Inventor: Fa-Ning Lu, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 104 days.

(21) Appl. No.: 11/309,722

(22) Filed: Sep. 15, 2006

(65) Prior Publication Data

US 2007/0187143 A1 Aug. 16, 2007

(30) Foreign Application Priority Data

Feb. 24, 2006 (TW) .................................. 95203162

(51) Int. Cl.
*H05K 9/00* (2006.01)
(52) U.S. Cl. .................. 174/386; 174/384; 361/816; 361/836
(58) Field of Classification Search .................. 174/377, 174/384, 386; 361/816, 818, 800, 836
See application file for complete search history.

(56) References Cited

U.S. PATENT DOCUMENTS

| | | | | |
|---|---|---|---|---|
| 3,699,394 | A | * | 10/1972 | Schuler ........................ 361/714 |
| 6,674,652 | B2 | | 1/2004 | Forte et al. |
| 2005/0061528 | A1 | * | 3/2005 | Bayar et al. .................... 174/51 |

* cited by examiner

*Primary Examiner*—Hung V Ngo
(74) *Attorney, Agent, or Firm*—Wei Te Chung

(57) ABSTRACT

An inverter (10) includes a circuit board (20) including a transformer (40) disposed thereon, and a shield cage assembly (60) for enclosing the transformer. The shield cage assembly includes an insulative cage (602) defining an inner receiving space (6028) for receiving the transformer, a first conductive cage (604) defining a first receiving space (6048) for receiving the insulative cage, and a second conductive cage (606) defining a second receiving space (6068) for receiving the first conductive cage. The shield cage assembly blocks EMI emitted by the transformer from interfering with electronic components out of the shield cage assembly, thus enabling the electronic components to perform more reliably.

15 Claims, 6 Drawing Sheets

SHIELD CAGE ASSEMBLY AND INVERTER UTILIZING THE SAME

FIELD OF THE INVENTION

The invention relates to a shield cage assembly, and particularly to a shield cage assembly and an inverter utilizing the same.

DESCRIPTION OF RELATED ART

Inverters are commonly used for converting low voltage direct current (DC) to high voltage alternating current (AC) in liquid crystal display (LCD) monitors. Each inverter includes a circuit board and a transformer disposed on the circuit board. The transformer often emits electromagnetic interference (EMI) at various frequencies during operation. In some cases, the EMI emitted by the transformer are radio frequency (RF) waves. However, electromagnetic waves of various other frequencies may also be emitted by the transformer.

Such emissions generated by the transformer are problematic because the EMI may adversely affect the performance of other components of the LCD monitors. For instance, the EMI emitted by the transformer may interfere with operations of a touch pad of the LCD monitors.

Therefore, a heretofore unaddressed need exists in the industry to overcome the aforementioned deficiencies and inadequacies.

SUMMARY OF THE INVENTION

An aspect of the invention provides a shield cage assembly. The shield cage assembly is used in an electronic device. The electronic device includes a circuit board and a transformer disposed on the circuit board. The shield cage assembly includes an insulative cage defining an inner receiving space for receiving the transformer, a first conductive cage defining a first receiving space for receiving the insulative cage, and a second conductive cage defining a second receiving space for receiving the first conductive cage.

Another aspect of the invention provides an inverter. The inverter includes a circuit board including a transformer disposed thereon, and a shield cage assembly for enclosing the transformer. The shield cage assembly includes an insulative cage defining an inner receiving space for receiving the transformer, a first conductive cage defining a first receiving space for receiving the insulative cage, and a second conductive cage defining a second receiving space for receiving the first conductive cage.

Other advantages and novel features will become more apparent from the following detailed description of preferred embodiments when taken in conjunction with the accompanying drawings, in which:

DETAILED DESCRIPTION OF THE INVENTION

Figure 1:
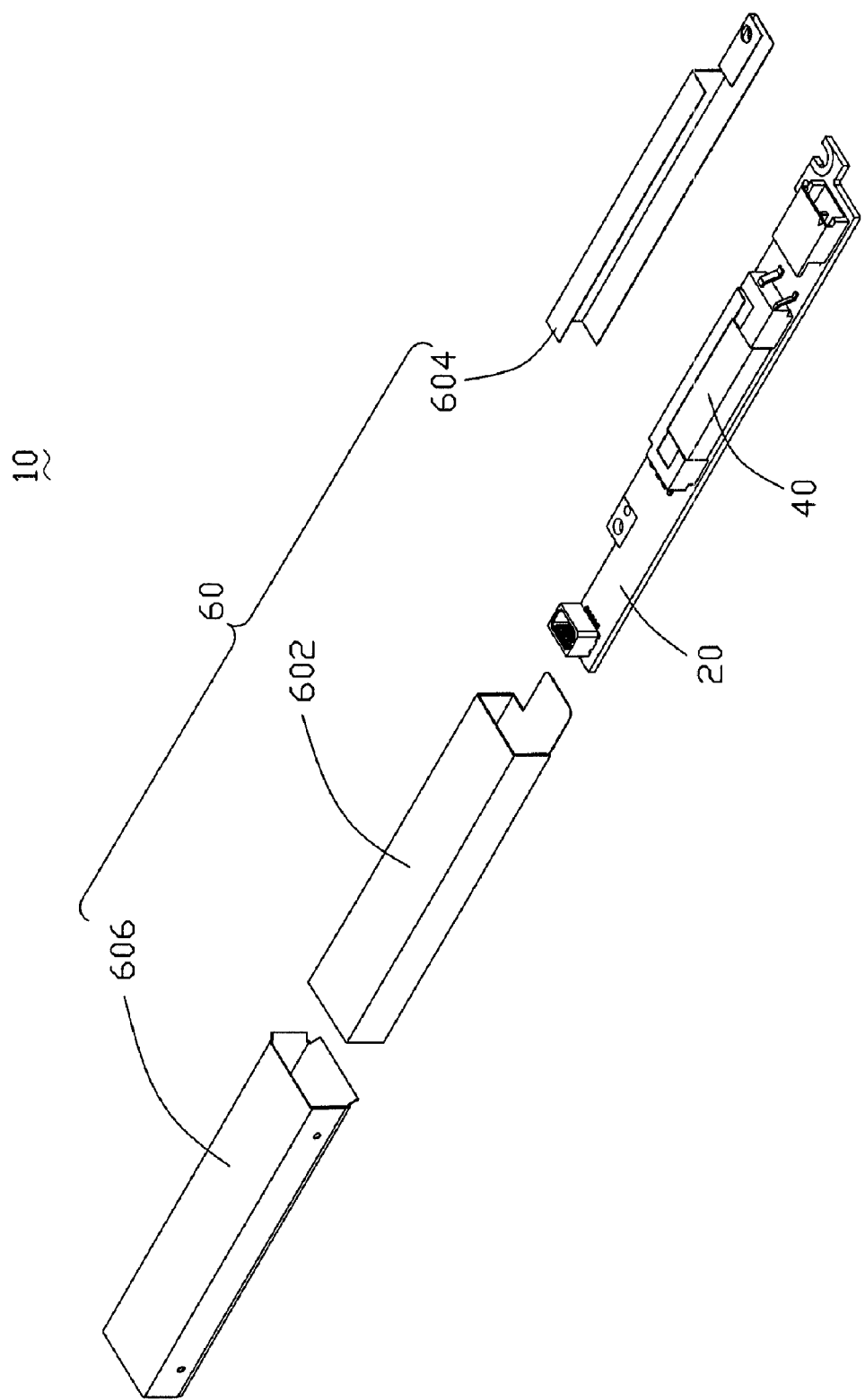
FIG. 1 is an exploded, isometric view of an inverter of an exemplary embodiment of the present invention, including a circuit board, a transformer, and a shield cage assembly.

FIG. 1 shows an inverter 10 of the exemplary embodiment of the present invention. The inverter 10, which is commonly used in a LCD monitor, comprises a circuit assembly like a circuit board 20, a transformer 40 disposed on the circuit board 20, and a shield assembly like a shield cage assembly 60 used for enclosing the transformer 40. The transformer 40 often emits electromagnetic interference (EMI) at various frequencies during operation, and the shield cage assembly 60 is used for blocking the EMI, preventing interference with other components of the LCD monitor.

Figure 2:
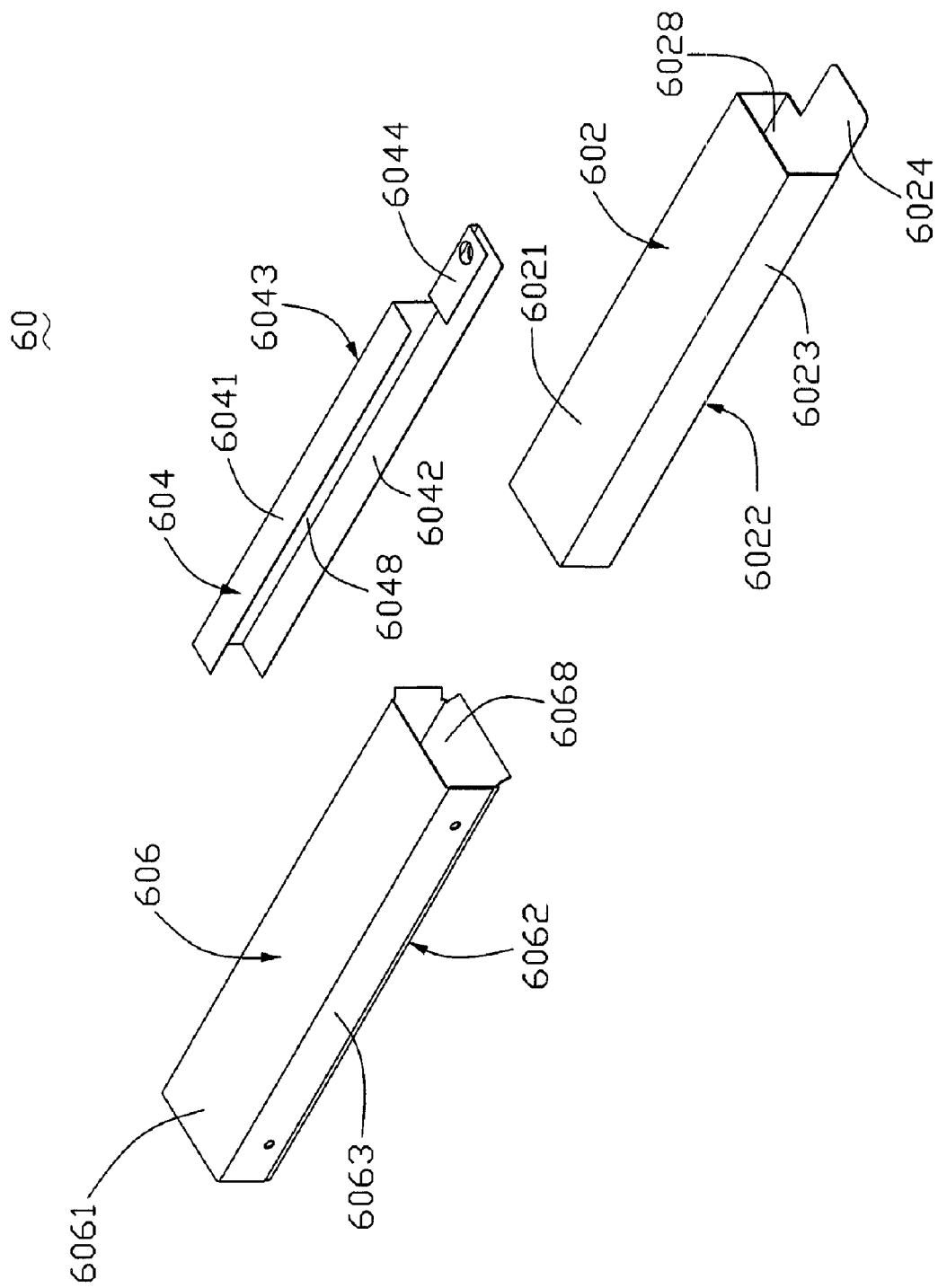
FIG. 2 is an exploded, isometric view of the shield cage assembly of FIG. 1.

FIG. 2 shows the shield cage assembly 60 of the exemplary embodiment. The shield cage assembly 60 comprises an insulative cage 602, a first conductive cage 604, and a second conductive cage 606.

The insulative cage 602 comprises an inner top plate 6021, an inner bottom plate 6022, and a pair of inner sidewalls 6023 perpendicular to the inner top and bottom plates 6021, 6022. The inner top plate 6021, the inner bottom plate 6022, and the inner sidewalls 6023 cooperatively bound an inner receiving space 6028 for receiving the transformer 40. The insulative cage 602 comprises a plastic material, or combination of various plastic materials, that are substantially nonconductive. Exemplary materials for the insulative cage 602 comprise ceramic, epoxy-fiberglass laminate, glass, plastic, polyester, transformer paper, and fishpaper. However, any other material or combination of materials providing a like function as disclosed herein may alternatively be employed. In this exemplary embodiment, the insulative cage 602 is made of polycarbonate.

The insulative cage 602 further comprises a securing portion 6024 having an adhesive smeared thereon. The securing portion 6024 extends from the inner bottom plate 6022 and is attached to the circuit board 20 by the adhesive for securing the shield cage assembly 60 on the circuit board 20.

The first conductive cage 604 comprises a first top plate 6041, a first bottom plate 6042, and a first sidewall 6043 perpendicular to the first top and bottom plates 6041, 6042. The first top plate 6041, the first bottom plate 6042, and the first sidewall 6043 cooperatively bound a first receiving space 6048 for receiving the insulative cage 602. The first conductive cage 604 further comprises a fixing portion 6044 secured on the circuit board 20. The first conductive cage 606 comprises one or more electrically conductive materials. In the exemplary embodiment, the first conductive cage 604 comprises a metallic material, or combination of various metallic materials. Exemplary metallic materials for the first conductive cage 606 substantially comprise copper, aluminum, copper alloy, aluminum alloy and the like. However, any other conductive material, whether metallic or non-metallic, having a like function as disclosed herein may alternatively be employed.

The second conductive cage 606 comprises a second top plate 6061, a second bottom plate 6062, a pair of second sidewalls 6063 perpendicular to the second top and bottom plates 6061, 6062. The second top plate 6061, the second bottom plate 6062, and the second sidewalls 6063 cooperatively bound a second receiving space 6068 for receiving the first conductive cage 604. The second conductive cage 606 comprises one or more electrically conductive materials. In the exemplary embodiment, the second conductive cage 606 comprises a metallic material, or combination of various metallic materials. Exemplary metallic materials for the second conductive cage 606 are tinplate, steel and the like. The metallic material of the second conductive cage 606 is different from the metallic material of the first conductive cage 604. However, any other conductive material, whether metallic or non-metallic, having a like function as disclosed herein may alternatively be employed.

Figure 3:
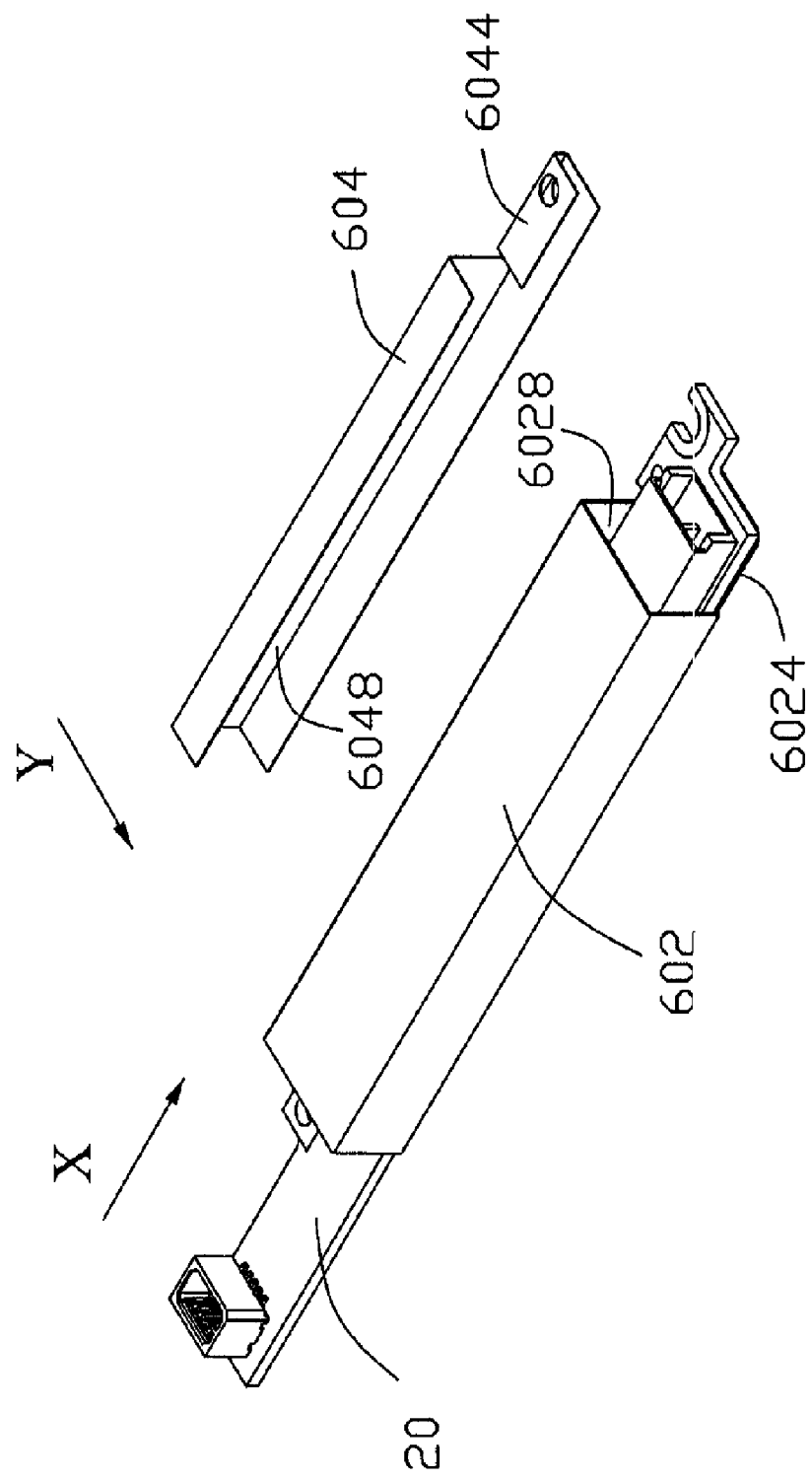
FIG. 3 is a partly assembled view of FIG. 1, showing a first conductive cage of the shield cage assembly not mounted to the circuit board.
Figure 4:
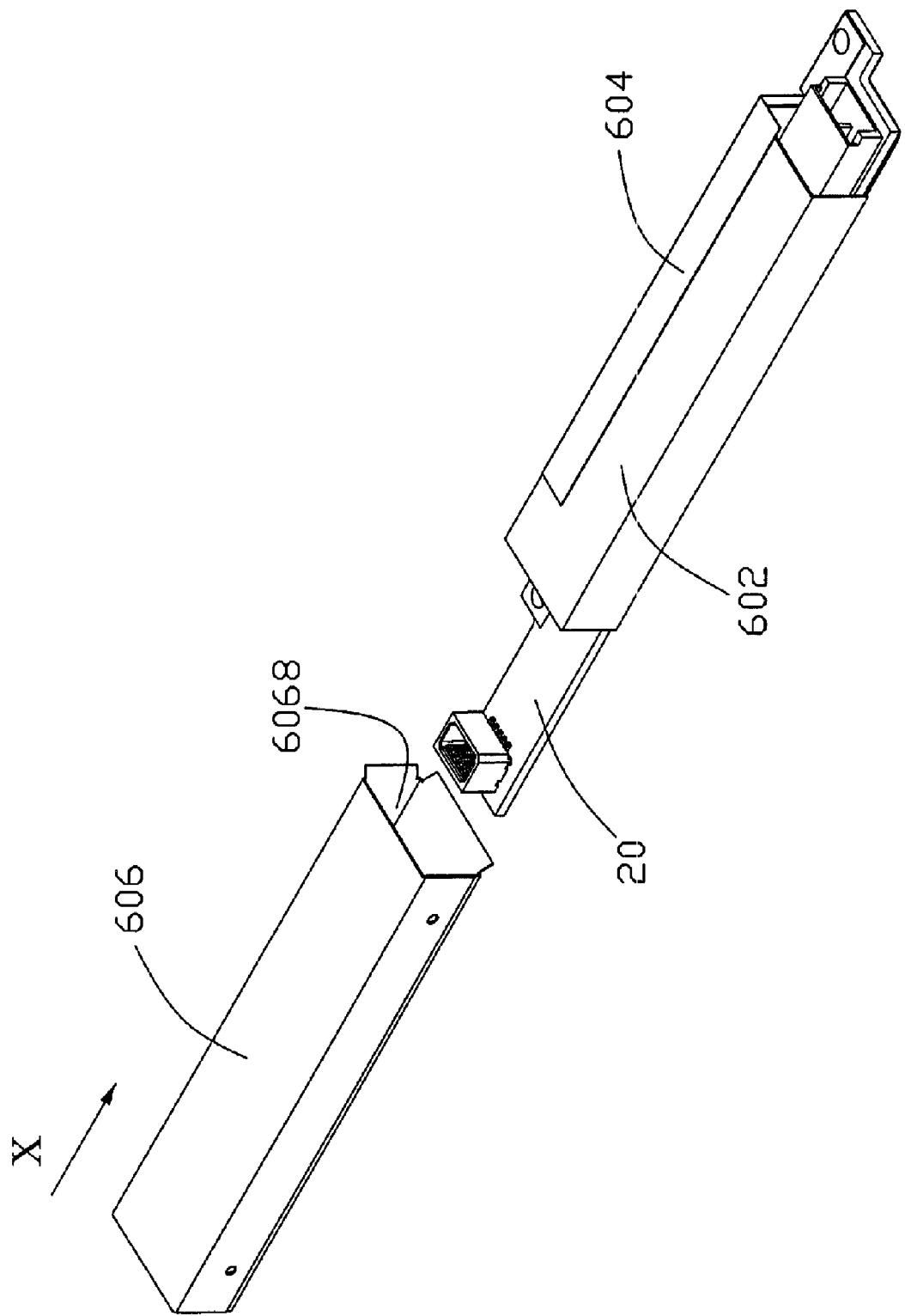
FIG. 4 is an assembled view of FIG. 1, showing a second conductive cage of the shield cage assembly not mounted to the first conductive cage of the shield cage assembly.
Figure 5:
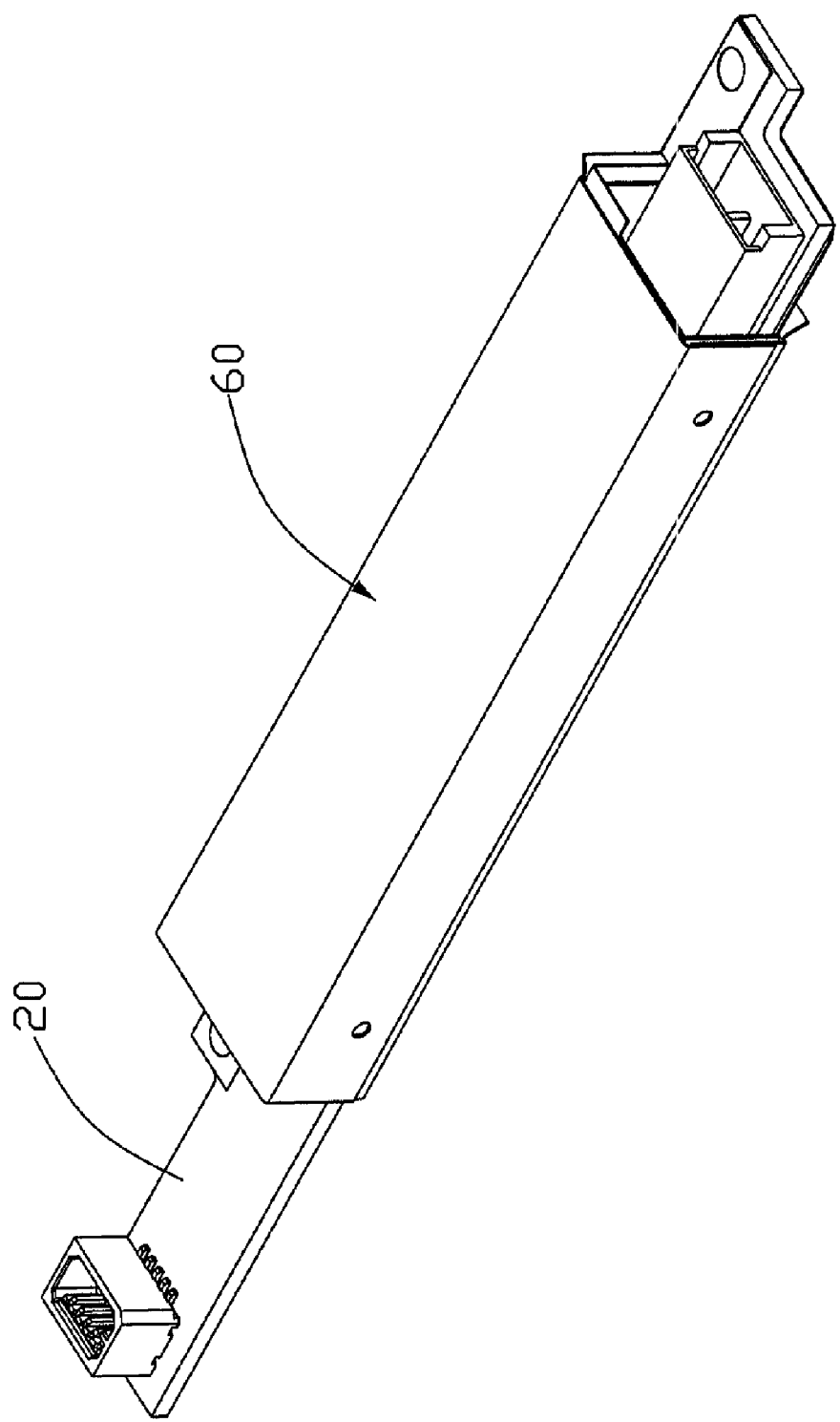
FIG. 5 is a completely assembled view of FIG. 1 of the exemplary embodiment.

Referring to FIGS. 3-5. In assembly, the insulative cage 602 is moved toward the circuit board 20 along a horizontal direction X to make the transformer 40 disposed on the circuit board 20 be received in the insulative cage 602. The securing portion 6024 of the insulative cage 602 is attached to the circuit board 20, enabling the insulative cage 602 to be stably secured on the circuit board 20. The first conductive cage 604 is moved toward the circuit board 20 along a horizontal direction Y perpendicular to the horizontal direction X. The fixing portion 6044 of the first conductive cage 604 is secured on the circuit board 20 thus making the first conductive cage 604 be secured on the circuit board 20. The insulative cage 602 is received in the first receiving space 6048. The second conductive cage 606 is moved toward the circuit board 20 along the horizontal direction X to make the insulative cage 602 and the first conductive cage 604 be received in the second receiving space 6068. The second conductive cage 606 is secured on the first conductive cage 604 by a known means such as a soldering process. In an alternative embodiment, the first conductive cage 604 is secured on the insulative cage 602 by an adhesive, and the second conductive cage 606 is also secured on the first conductive cage 604 by an adhesive.

In operation, the insulative cage 602 of the shield cage assembly 60 serves to electrically insulate the transformer 40 from the first and second conductive cage 604 and 606 thus preventing discharged current from the transformer 40 damaging nearby electronic components. The first conductive cage 604 and the second conductive cage 606 serve to effectively block the EMI emitted by the transformer 40. In this way, the effective performance of the other components of the LCD monitor, even if they are electromagnetic sensitive components, is ensured. Further, the first conductive cage 604 can further block ambient EMI from interfering with the components enclosed therein.

In various alternative exemplary embodiments, the metallic material for the first conductive cage 604 is tinplate, steel or the like, while the metallic material for the second conductive cage 606 is copper, aluminum, copper alloy, aluminum alloy or the like, which is still different from the metallic material for the first conductive cage 604.

Figure 6:
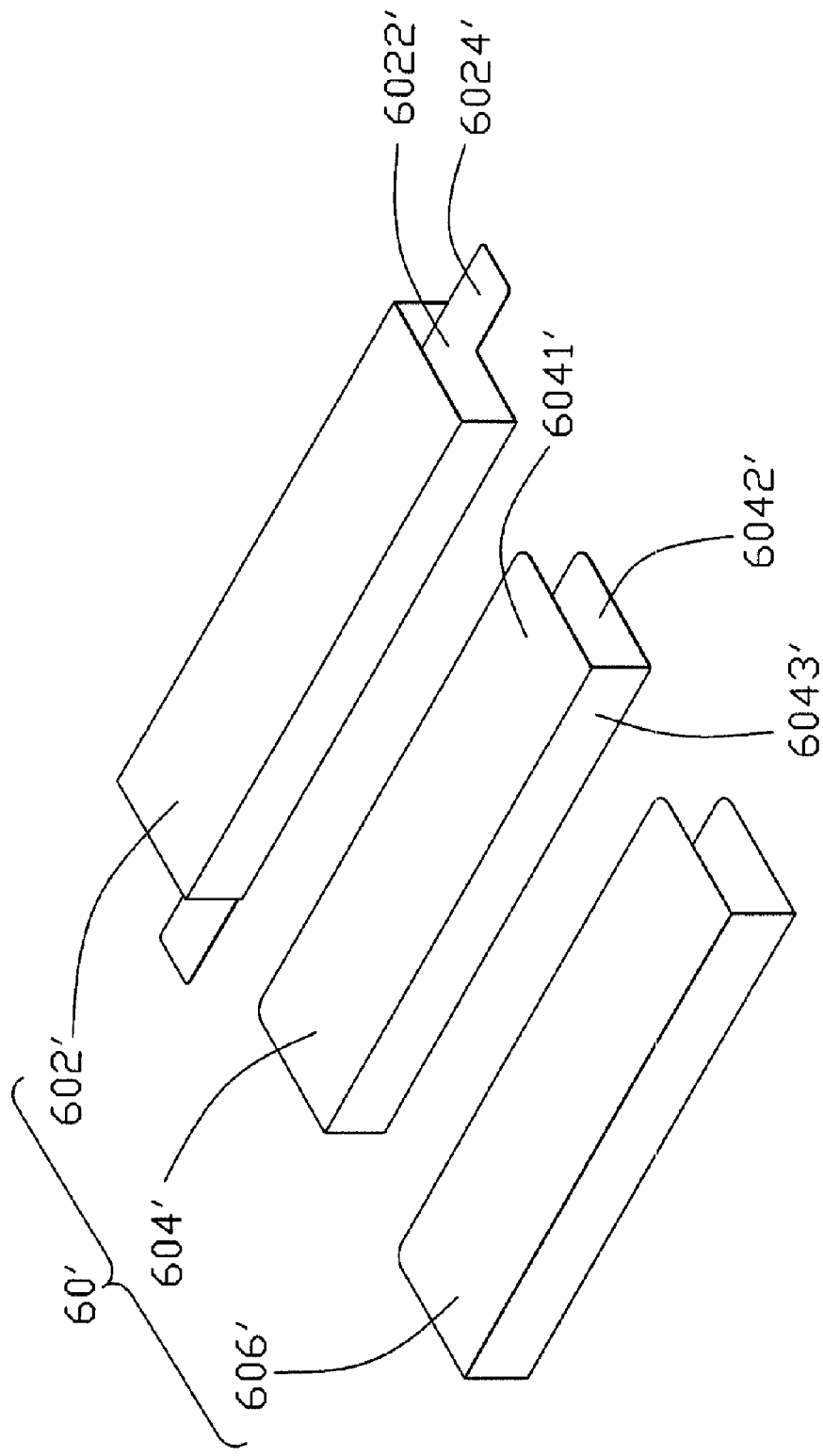
FIG. 6 is an exploded, isometric view of a shield cage assembly of another exemplary embodiment of the present invention.

FIG. 6 shows an alternative shield cage assembly 60' of another exemplary embodiment of the present invention. In the exemplary embodiment, the insulative cage 602' comprises a pair of securing portions 6024' extending from opposite ends of the inner bottom plate 6022' respectively. The first conductive cage 604' comprises a first top plate 6041', a first bottom plate 6042', and a first sidewall 6043' perpendicular to the first top plate 6041' and the first bottom plate 6042'. The second conductive cage 606' has a similar structure to the first conductive cage 604'. Materials used for the shield cage assembly 60' are similar to the above-described shield cage assembly 60. In assembly, the insulative cage 602' encloses the transformer 40 of FIG. 1. The first conductive cage 604' then clips to the insulative cage 602'. The second conductive cage 606' then clips to the first conductive cage 604'. In this way, the shield cage assembly 60 can provide the same function as disclosed in the above-described exemplary embodiment of FIG. 1 to FIG. 5.

While exemplary embodiments of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A shield cage assembly used in an electronic device comprising a circuit board and a transformer disposed on the circuit board, comprising:

an insulative cage defining an inner receiving space for receiving the transformer and comprising an inner bottom plate, an inner top plate, and a pair of inner sidewalls perpendicular to the inner bottom plate and the inner top plate, wherein the inner bottom plate, the inner top plate and the inner sidewalls cooperatively form the inner receiving space;

a first conductive cage defining a first receiving space for receiving the insulative cage; and a second conductive cage defining a second receiving space for receiving the first conductive cage.

2. The shield cage assembly as claimed in claim 1, wherein the insulative cage comprises a securing portion having an adhesive smeared thereon for securing the shield cage assembly on the circuit board.

3. The shield cage assembly as claimed in claim 1, wherein the first conductive cage comprises a fixing portion secured on the circuit board.

4. The shield cage assembly as claimed in claim 1, wherein the first conductive cage comprises a first bottom plate, a first top plate, and a first sidewall perpendicular to the first bottom plate and the first top plate, the first bottom plate, the first top plate and the first sidewall cooperatively form the first receiving space.

5. The shield cage assembly as claimed in claim 1, wherein the second conductive cage comprises a second bottom plate, a second top plate, and a second sidewall, the second bottom plate, the second top plate and the second sidewall cooperatively form the second receiving space.

6. The shield cage assembly as claimed in claim 1; wherein the second conductive cage comprises a second bottom plate, a second top plate, and a pair of second sidewalls, the second bottom plate, the second top plate and the second sidewalls cooperatively form the second receiving space.

7. The shield cage assembly as claimed in claim 1, wherein the insulative cage comprises a plastic material, and the first and second conductive cage each comprises a metallic material.

8. An inverter, comprising:

a circuit board comprising a transformer disposed thereon; and a shield cage assembly for enclosing the transformer, comprising:

an insulative cage defining an inner receiving space for receiving the transformer and comprising an inner bottom plate, an inner top plate, and a pair of inner sidewalls perpendicular to the inner bottom plate and the inner top plate, wherein the inner bottom plate, the inner top plate and the inner sidewalls cooperatively form the inner receiving space;

a first conductive cage defining a first receiving space for receiving the insulative cage; and a second conductive case defining a second receiving space for receiving the first conductive cage.

9. The inverter as claimed in claim 8, wherein the insulative cage comprises a securing portion having an adhesive smeared thereon for securing the shield cage assembly on the circuit board.

10. The inverter as claimed in claim 8, wherein the first conductive cage comprises a fixing portion secured on the circuit board.

11. The inverter as claimed in claim 8, wherein the first conductive cage comprises a first bottom plate, a first top plate, and a first sidewall perpendicular to the first bottom plate and the first top plate, the first bottom plate, the first top plate and the first sidewall cooperatively form the first receiving space.

12. The inverter as claimed in claim 8, wherein the second conductive cage comprises a second bottom plate, a second top plate, and a second sidewall, the second bottom plate, the second top plate and the second sidewall cooperatively form the second receiving space.

13. The inverter as claimed in claim 8, wherein the second conductive cage comprises a second bottom plate, a second top plate, and a pair of second sidewalls, the second bottom plate, the second top plate and the second sidewalls cooperatively form the second receiving space.

14. The inverter as claimed in claim 8, wherein the insulative cage comprises a plastic material, and the first and second conductive cage each comprises a metallic material.

15. An inverter comprising:

a circuit assembly comprising a transformer installable therein for inverting of said inverter; and a shield assembly for enclosing said transformer therein, said shield assembly comprising:

a first shield means made of a first electrically conductive material to enclose said transformer therein;

a second shield means made of a second electrically conductive material different from said first material and discretely formed from said first shield means to enclose said first shield means and said enclosed transformer by said first shield means therein, said first and second shield means performing electrical shielding for said inverter differently based on said different first and second material respectively; and an insulative means installable in said first shield means to enclose said transformer and to be installed between said transformer and said first shield means in order for electrically insulating said transformer from said first shield means, the insulative means comprising an inner bottom plate, an inner top plate, and a pair of inner sidewalls perpendicular to the inner bottom plate and the inner top plate.

* * * * *